US008396214B2

(12) United States Patent
Helfman et al.

(10) Patent No.: US 8,396,214 B2
(45) Date of Patent: Mar. 12, 2013

(54) METHOD AND APPARATUS FOR CENTRALLY MANAGED ENCRYPTED PARTITION

(75) Inventors: Nadav Binyamin Helfman, Binyamina (IL); Aidan Shribman, Tel-Aviv (IL)

(73) Assignee: SAP Portals Israel Limited, Ra'Anana (IL)

( * ) Notice: Subject to any disclaimer, the term of this patent is extended or adjusted under 35 U.S.C. 154(b) by 1654 days.

(21) Appl. No.: 11/592,280

(22) Filed: Nov. 2, 2006

(65) Prior Publication Data
US 2008/0107262 A1    May 8, 2008

(51) Int. Cl.
H04L 9/00    (2006.01)
(52) U.S. Cl. .......................................... 380/44; 713/193
(58) Field of Classification Search .................. 713/185, 713/189; 726/34
See application file for complete search history.

(56) References Cited

U.S. PATENT DOCUMENTS

| | | |
|---|---|---|
| 5,606,317 A | 2/1997 | Cloonan et al. |
| 5,640,563 A | 6/1997 | Carmon |
| 6,038,593 A | 3/2000 | Huckins |
| 6,105,136 A * | 8/2000 | Cromer et al. .................. 726/34 |
| 6,115,384 A | 9/2000 | Parzych |
| 6,230,160 B1 | 5/2001 | Chan et al. |
| 6,269,402 B1 | 7/2001 | Lin et al. |
| 6,445,313 B2 | 9/2002 | Ahn |
| 6,480,123 B2 | 11/2002 | Tsutsui et al. |
| 2001/0039565 A1 | 11/2001 | Gupta |
| 2002/0166053 A1 * | 11/2002 | Wilson ............................ 713/189 |
| 2004/0103288 A1 * | 5/2004 | Ziv et al. ........................ 713/185 |

FOREIGN PATENT DOCUMENTS

WO    WO 99/67886    12/1999

OTHER PUBLICATIONS

Andy McFadden Hacking Data Compression Lesson 1 Introduction, Internet Article 30 Oct. 2002—XP002379865.
M Nelson LZW Data Compression—Dr. Dobb's Journal, M& T published Redwood City, CA, US, Oct. 1989.
Microsoft Technet—Overview of Deploying a Managed Environment Process—Mar. 28, 2003 http://technet2.microsoft.com/WindowsServer/en/library/4a05be6b-09fd-444f-ac6f-c2292f4931961033.mspx?pf=true.

* cited by examiner

*Primary Examiner* — Brandon Hoffman
*Assistant Examiner* — Nega Woldemariam
(74) *Attorney, Agent, or Firm* — Buckley, Maschoff & Talwalkar LLC

(57) ABSTRACT

A method and apparatus for protecting a remote computer connected through a network to a main computer, by creating a cryptokey on the main computer, supplying the cryptokey to the remote computer and mounting a partition on the remote computer using the cryptokey. The cryptokey is not persistently stored on the remote computer but rather saved in its memory, and the connection of the remote computer to the main computer is periodically tested. Once the remote computer is disconnected, the encrypted partition is unmounted and the cryptokey is erased form the memory, thus disabling access of an attacker to data stored in the encrypted partition. The method incorporates swap partition encryption using a cryptokey created each time during the boot of the remote computer.

8 Claims, 3 Drawing Sheets

METHOD AND APPARATUS FOR CENTRALLY MANAGED ENCRYPTED PARTITION

BACKGROUND OF THE INVENTION

1. Field of the Invention

The present invention relates to computer security in general, and to a method and apparatus for protecting content stored on a computerized device from physical attack attempted at the device.

2. Discussion of the Related Art

Many organizations employ a computing environment comprising a central host computer, connected through a communication channel such as a wide area network (WAN) or local area network (LAN) to one or more remote stations. The remote stations are generally stationary and are continuously active and connected to the central computer. Sensitive data may be stored both on the central computer and on the remote stations. The central computer is usually tightly secured, being locked in a room with limited access, a physical lock or other measures. However, the remote computers are often dispersed over a wide area, including for example separate buildings, so tight security measures can not always be applied for each remote computer. Thus, data stored on a remote computer may be available to an attacker physically capturing the remote computer or part thereof such as a hard disk, disconnecting it from the communication channel and possibly taking it to another location for further inspection. Another type of attack may comprise the attacker installing a "Trojan Horse" application, i.e. an application that collects data from the on going usage of the computer, including files, folders, nicknames, passwords or the like, and stores it for later usage, when the installer of the Trojan Horse physically captures the computer. Another security hazard may be when an attacker alters the root partition of a computer to disable a remote host protection (such as a firewall) and then starts up the computer and breaks into the network.

A number of solutions were suggested to these security problems. One solution was suggested by Levy et al. in U.S. Pat. No. 5,748,744 titled SECURE MASS STORAGE SYSTEM FOR COMPUTERS, disclosing the storage of data on the remote computer as cyphertext, wherein the keys are stored on the medium itself. Thus, the attacker has access both to the key and to the data, so he can use the key to decipher the data. Another solution was suggested by Corder in U.S. Pat. No. 7,069,447 titled APPARATUS AND METHOD FOR SECURE DATA STORAGE, which suggests storing confidential data incorporating data encryption and user authentication. Attempts to attack data stored on a computer by multiple unsuccessful login attempts is detected during user authentication and users are locked out. However, if an attacker does possess a password, the data is available to him even when the computer was removed from the organization. An additional drawback is that U.S. Pat. No. 7,069,447 requires an interactive session for accessing the encrypted data, and is thus not suitable for appliances or servers.

There is therefore a need for a solution which will disable an attacker from accessing data stored on a computer, once the computer has been removed from a network connecting it to a central computer. The solution should also protect the data from unauthorized access to the computer even when it is connected to the network.

SUMMARY OF THE PRESENT INVENTION

The present invention provides a novel method and apparatus for centrally managed partition encryption.

In an exemplary embodiment of the present invention, there is thus provided in a computer network comprising one or more main computers comprising a first storage device and one or more remote computers each remote computer comprising a memory unit and a second storage device, a method for protecting data stored on the second storage device of the remote computer, the method comprising the steps of: creating a first cryptokey; storing the first cryptokey on the first storage device of the main computer; authenticating the remote computer to the main computer; providing the first cryptokey to the remote computer; storing the first cryptokey in the memory unit of the remote computer; and mounting an operative partition encrypted with the first cryptokey on the remote computer, said operative partition mapped to the second storage device, whereby said data stored on said second storage device is accessible only if said remote computer is authenticated by said main computer. The method can further comprises the steps of: creating a second cryptokey; creating a swap partition encrypted with the second cryptokey on a hard disk of the remote computer; and mounting the swap partition on the remote computer. Optionally, the method further comprises the steps of testing whether the remote computer is connected to the main computer, and unmounting the operative partition and erasing the first cryptokey from the memory unit of the remote computer, if the remote computer is not connected to the main computer. The authentication step optionally comprises considering one or more rules. Each rule optionally relates to one or more of the group consisting of: when was the remote computer disconnected from the network; a user of the remote computer; or an intended use of the remote computer. The swap partition is optionally created and mounted during each boot sequence of the remote computer.

Another aspect of the disclosed invention relates to an apparatus for protecting data stored on a storage device associated with one or more remote computers connected through a network to one or more main computers, the apparatus comprising: a cryptokey generator for generating one or more cryptokeys; a partition generating component for generating one or more encrypted partitions using the cryptokey; a mount/unmount device for mounting or unmounting the encrypted partition to the remote computer using the cryptokey, said encrypted partition mapped to the storage device; a connection testing component for testing whether the remote computer is connected to the main computer through the network; and an authentication component for determining whether the remote computer is authenticated for being connected to the main computer. Within the apparatus the encrypted partition is a swap partition. Optionally, the cryptokey generator is run by the remote computer. Within the apparatus, the encrypted partition is an operative partition. Optionally, the cryptokey generator is run by the main computer.

Yet another aspect of the disclosed invention relates to a computer readable storage medium containing a set of instructions for a general purpose computer, the set of instructions comprising: creating a first cryptokey; storing the first cryptokey on a first storage device of a main computer; authenticating one or more remote computer to the main computer; providing the first cryptokey to the remote computer; storing the first cryptokey in a memory unit of the remote computer; and mounting an operative partition encrypted with the first cryptokey to the remote computer, said operative partition mapped to a second storage device storing data whereby the data is accessible only if the remote computer is authenticated by the main computer.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION OF THE PREFERRED EMBODIMENT

The present invention overcomes the disadvantages of the prior art by providing a novel solution which provides centrally managed protection for data stored on a remote computer, for situations when the computer is disconnected from a network, and when an unauthorized user is trying to access the data.

In accordance with a preferred embodiment of the disclosed invention, a hard disk of a remote computer, wherein said hard disk contains confidential or sensitive information is partitioned into at least three distinct partitions, comprising a clear, i.e., unencrypted root partition, an encrypted swap partition or swap file in the Windows Operating system, and an encrypted data partition. The key to the encrypted data partition, such as a password or another cryptokey is stored only on the central computer, is provided to the remote computer upon login and is kept only in the local computer's memory unit rather than persistently on its storage device. Once the password is available to the remote computer, the data partition is mounted and access is enabled to its contents. Then, if the connection between the remote computer and a main, central, or service-providing computer is broken, for example when the remote computer is disconnected from the network or rebooted, the password is erased from the remote's computer's memory, so the contents of the encrypted partition can not be accessed. Then, authentication is required in order to reconnect the main and the remote computers, and to re-supply the password to the remote computer. The swap partition used by the remote computer is encrypted using a password which is preferably generated by the remote computer itself. The password is optionally erased from the memory of the remote computer when the connection between the two computers is broken. Once the remote computer is rebooted, the remote computer regenerates a password for the swap partition and regenerates the swap partition. The password with which the current contents of the swap partition were encrypted is of no particular importance, since the swap partition is designed for temporary storage of memory fragments, making its contents irrelevant for subsequent sessions.

Figure 1:
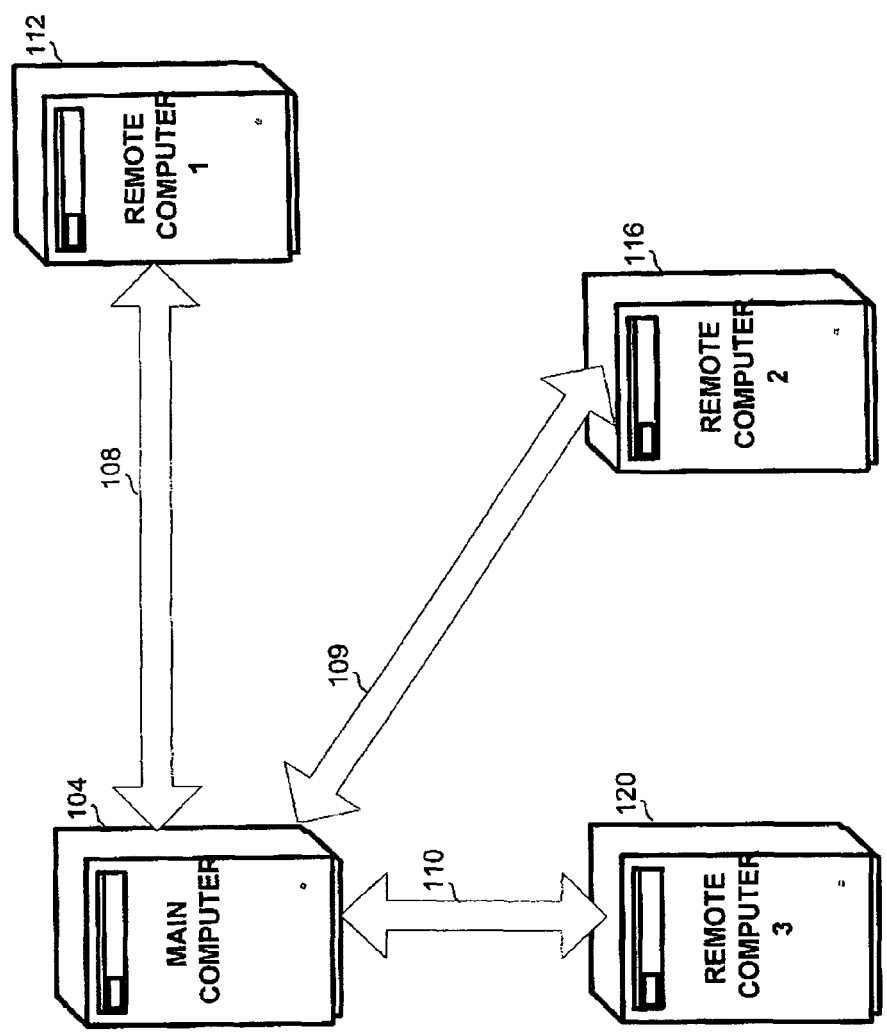
FIG. 1 is a block diagram of a typical environment in which the disclosed invention is used.

Referring now to FIG. 1, showing a typical environment in which the disclosed invention is used. The environment is a computing network or a part thereof of an organization. The computing network comprises a main computer 104, also referred to as a central computer. The term central computer refers to its role in operation, and is not intended to provide a geographical indication for its location within the network. Main computer 104 is connected to a communication network (not shown), preferably using a virtual private network (VPN). The message traffic of the VPN can be carried over a wide area network (WAN), a local area network (LAN), the Internet, or the like. Main computer 104 is connected through the network to remote computer 1 (112), remote computer 2 (116) and remote computer 3 (120). The connection between main computer 104 and remote computer 1 (112) is a logical channel (sometimes named tunnel) with monitored state 108. Channel 108 is a logical entity implemented over the network, similarly to a VPN. Channel 108 thus simulates a point-to-point connection since the communication contents are encrypted, and the communication protocol is preferably proprietary. Channel 108 is a constantly active connection which is monitored for being active by the main computer. Similarly the connection between main computer 104 and remote computer 2 (116) is performed by a logical channel with monitored state 109, and the connection between main computer 104 and remote computer 3 (120) is performed by logical channel with monitored state 110. Each of main computer 104, remote computer 1 (112), remote computer 2 (116) or remote computer 3 (120) is preferably a computing platform, such as a network computer, a personal computer, a mainframe computer, or any other type of computing platform that is provisioned with a memory unit (not shown), a CPU or microprocessor device, one or more communication devices, a storage device (not shown) and several I/O ports (not shown). Alternatively, any of said computers can be a DSP chip, an ASIC device storing the commands and data necessary to execute the methods of the present invention. Typically, main computer 104 is a server, and provides one or more services such as authentication, application delivery, storage or others to remote computer 1 (112), remote computer 2 (116) or remote computer 3 (120). It will be appreciated by a person skilled in the art that the shown architecture is exemplary only, and that the network can comprise any number and type of main computers or remote computers, as long as each remote computer has access to an at least one main computer for receiving services.

Figure 2A:
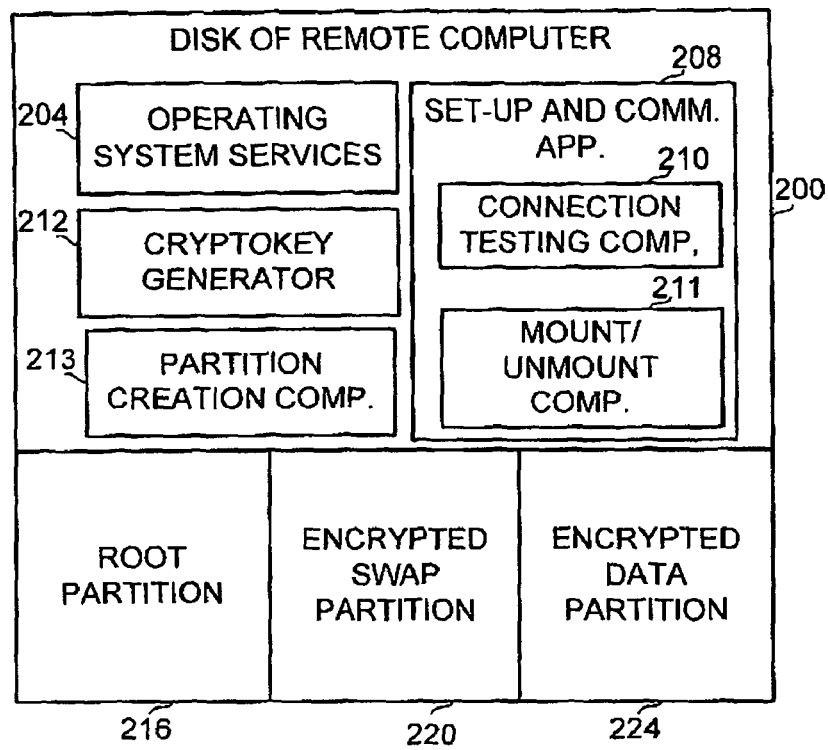
FIG. 2A is a block diagram showing the main components stored on a storage device of a remote computer, in accordance with a preferred embodiment of the disclosed invention.

Referring now to FIG. 2A, showing the contents of a storage device, such as a hard disk of a remote computer set up according to the disclosed invention. FIG. 2A shows the disk during run-time, after installation and boot took place, as discussed in association with FIG. 3 below. Hard disk 200 of each remote computer comprises operating system services 204, containing code and data of the operating system used for operating the computing platform. The hard disk further comprises set-up and communication application 208 for establishing the communication of the remote computer with the main computer and for verifying the on-going communication. Set-up and communication application 208 comprises connection testing component 210 for testing whether the connection between the remote computer and the main computer is active, and mount/unmopunt component 211 for mounting and unmounting the encrypted swap partition and the encrypted operative partitions. Hard disk 200 further comprises password generator 212 for generating a password or a cryptokey for swap partition 220 as detailed below. Hard disk 200 further comprises a partition generation component 213 for creating an at least one partition using the cryptokey. Component 213 can be used for generating both a swap partition and an operative partition. Components 204, 208, 210, 211, 212 and 213 are preferably software components, implemented as one or more collections of computer instruction codes or data structures, written in any desired programming language, such as but not limited to C, C++, C#, Java or others, and under any development environment. Components 204, 208, 210, 211, 212 and 213 can take a form of executables, libraries, DLLS, script files, modules, or any other technology currently known or that will be developed in the future, or any combination thereof. Hard disk 200 further comprises three partitions, a clear, i.e. non-encrypted root partition 216, comprising the software and data required for booting the device and starting the operating system. Hard disk 200 further comprises an encrypted swap partition 220, used by the operating system for swapping out memory pages. Swap partition 220 is created and mounted during each boot sequence of the remote computer, using a random password generated by cryptokey generator 212. Swap partition 220 is encrypted, since important and privileged information may be contained in memory during the on-going work, and temporarily stored in the swap partition for purposes such as memory management that require swapping memory pages. Swap partition 220 is re-created with each booting since the contents stored in the swap partition during a previous session are irrelevant for a current session, so overwriting them does not cause loss of important data. Thus, the password can be generated by the remote computer and saved in the memory thereof, and does not have to be known by the main computer. Alternatively, the swap partition password can be generated by the main computer and sent to the remote computer. Hard disk 200 further comprises an encrypted operative partition 224, comprising data, executables or any other files that should be encrypted. Partition 224 is encrypted using a cryptokey (or password) centrally generated and provisioned by the main computer and delivered to the remote computer upon boot, or when the connection between the two computers is recreated, according to guidelines as detailed below. Once the password is supplied to the remote computer, partition 224 is mounted and its contents are made available to a user. When the connection to the main computer is lost, the password is erased from the memory unit of the remote computer, and partition 224 is unmounted. For re-mounting partition 224, further authentication of the remote computer or a user thereof is required.

It will be appreciated by a person skilled in the art that the contents and partitions of the disk as detailed above may reside on physically separate storage devices, and not necessarily on one physical disk. It will also be appreciated that only components which relate to the disclosed invention are shown in FIG. 2A and additional files including data, executables, configuration or other files, directories, or partitions may reside on one or more storage devices of the remote computing platform and may be accessible to a user thereof.

Figure 2B:
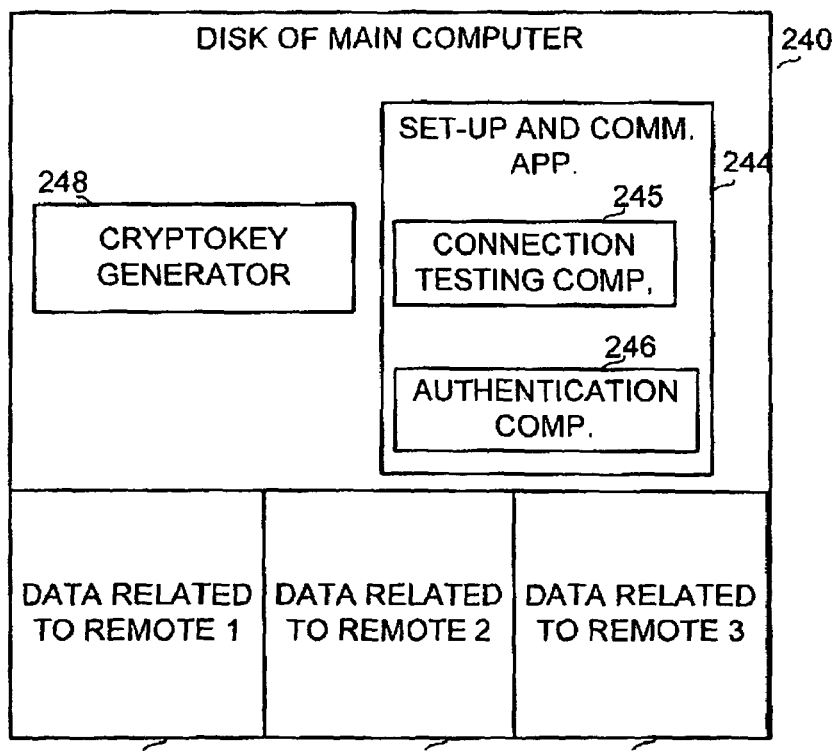
FIG. 2B is a block diagram showing the main components stored on a storage device of a main computer, in accordance with a preferred embodiment of the disclosed invention.

Referring now to FIG. 2B, showing the contents of a hard disk of a main computer set up according to the disclosed invention. As in FIG. 2A above, only the components relevant to the disclosed invention are shown, while additional components such as files, directories, services or the like may exist on the main computer. Hard disk 240 of main computer comprises a set-up and communication application 244 for setting up the communications and communicating with one or more remote computers. Set-up and communication application 244 comprises connection testing component 245 for testing whether the connection between the main computer and one or more remote computers is active, and authentication component 246 for determining whether to authenticate a connection between the main computer and a remote computer, according to one or more rules detailed below. Hard disk 240 further comprises a cryptokey generator 248, for generating a password for an operative partition of a remote computer. The password is generated by generator 248 and sent to the relevant remote computer when the remote computer reboots or when connection is created between the two computers. Components 244, 245, 246 and 248 are preferably software components, implemented as one or more collections of computer instruction codes or data structures, written in any desired programming language, such as but not limited to C, C++, C#, Java or others. Components 244, 245, 246 and 248 can take a form of executables, libraries, DLLS, script files, modules, or any other technology currently known or that will be developed in the future, or any combination thereof. Hard disk 240 further comprises data relevant for each remote computer, such as data related to remote 1 (252), data related to remote 2 (256), data related to remote 3 (260), or the like, for each remote computer that is connected to the central computer through the disclosed invention. The relevant data includes at least the centrally provisioned cryptokey generated for that computer, once the password is generated. The password is not stored on the hard disk of the remote computer, thus, making the password and the contents of the encrypted operative partition of the remote computer unavailable to a person who disconnected the remote computer. The data related to a remote computer, such as data related to remote 1 (252) optionally comprises also rules or other data related to the remote computer, such as rules for automatic reconnection in case the connection is broken, one or more user names for which connection should be established with or without further conditions, or other data.

Figure 3:
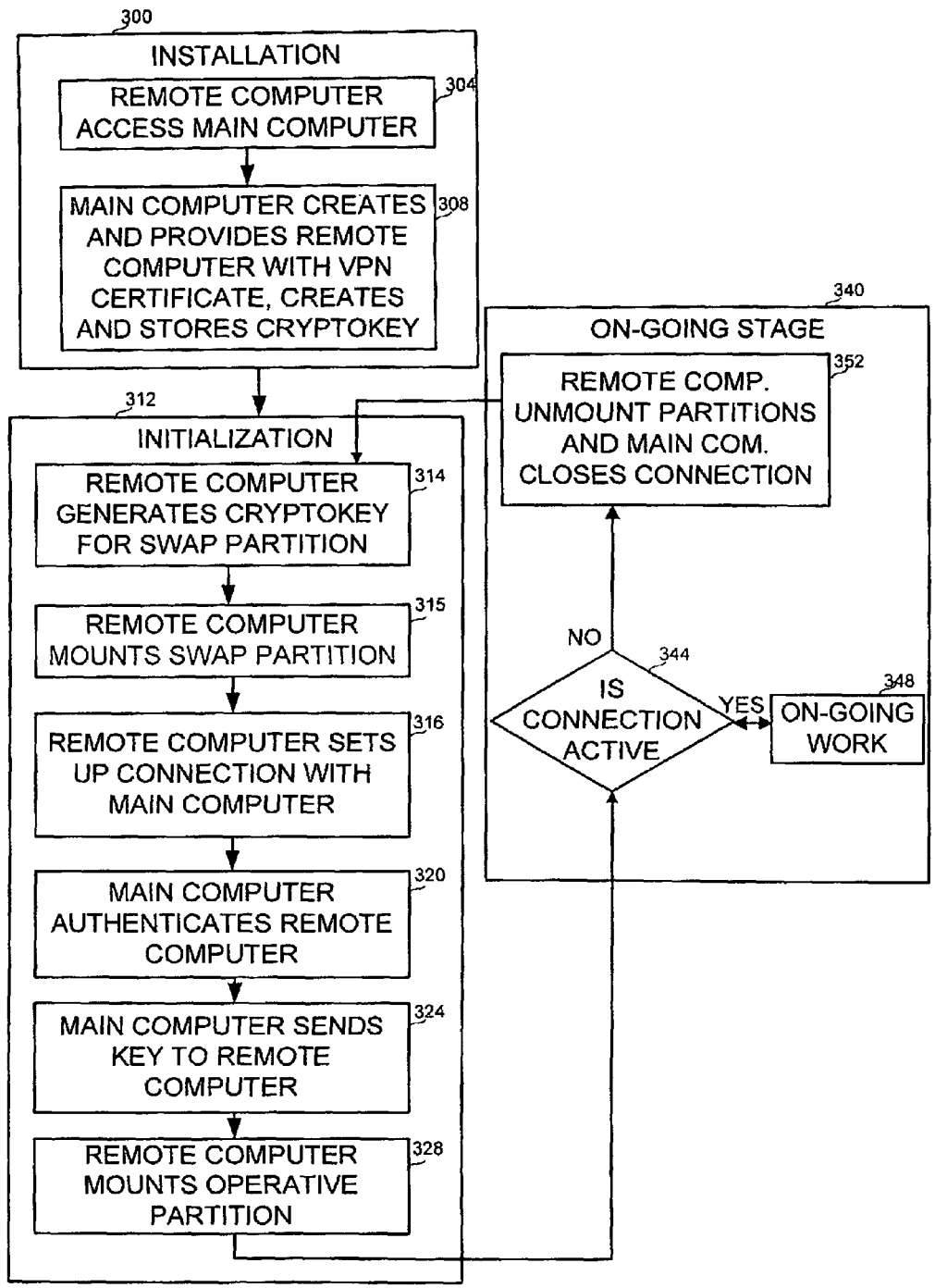
FIG. 3 is a flowchart of the main steps of a data protection method, in accordance with a preferred embodiment of the disclosed invention.

Referring now to FIG. 3, showing a flowchart of the main steps associated with the method of the disclosed invention. The steps include a first set of steps 300 performed at installation time of the remote computer. Within installation steps 300 the first step is step 304 in which the remote computer accesses the main computer, using an interactively provided password (for example a password provided by a system administrator). Then, at step 308 the main computer creates a VPN certificate and sends it to the remote computer for future connections. Also at step 308, the main computer further generates a cryptokey for the remote computer and stored it on its hard disk or on another accessible location. Once installation is completed, the remote computer can boot and connect to the network, using initialization steps 312. The first step of initialization steps 312, is step 314, at which the remote computer generates a random cryptokey for the swap partition. Then at step 315 the remote computer creates and mounts an encrypted swap partition using the random cryptokey. The newly created swap partition occupies the same area as it did during the previous session of the remote computer, since the same partition device (which is a logical splitting of the physical hard disk) is used as swap partition. If an encrypted swap partition was created earlier, it is overwritten and its contents are destroyed since they are not required. Steps 314 and 315 are performed prior to communication with the network is attempted, since the SWAP partition is required during operating system services startup. Then, at step 316, the remote computer sets up a secure connection with the main computer using the VPN certificate received at step 308. Then at step 320 the main computer authenticates the remote computer, and determines whether the connection is to be approved. This step is further detailed below. Provided that the authentication was successful, at step 324 the main computer sends the cryptokey generated at step 308 to the remote computer. At step 328 the remote computer uses the cryptokey for possibly creating the encrypted operative partition if the partition was not created earlier, and for mounting the newly created partition and/or an existing partition. An encrypted partition is mounted into a mount point, such that the content is addressed by the user as clear text. Mounting refers to associating a physical device with a location in a file system. For example, in Windows, mounting refers to associating a device with a letter, such as "G:". In Linux, mounting is associating a device with a logical name, such as "\home\L1". However, since the contents of the physical device are encrypted, an associating action is involved, which decrypts the contents, and allows the user to access it. A non encrypted partition (for example named /dev/hda on a Linux operating system) can be mounted directly to a directory mount point (such as /home/a/). However, if the partition (such as /dev/hdb) is encrypted then an additional step (referred to as the "associating action") is required, in which the partition would first be associated with a logical device (such as /dev/mapper/hdb) representing the clear text content of the partition, followed by mounting the logical device (such as /dev/mapper/hdb) to mount point (such as /home/b/). The cryptokey for the encrypted operative partition is only kept in the remote computer's memory and is not persistent on its disk or other storage, so that it will not be available to an attacker who disconnected the remote computer form the network or rebooted it. After initialization steps 312 are done, the remote computer goes into on going stage 340. In on going stage 340, the remote computer and the main computer periodically test the connection to each other at step 344. The periodicity of the testing should be such that would not enable even a skilled person to disconnect the computer, remove the disk and reconnect the disk, or alternatively alter the root partition to disable the remote host protection (such as firewall) and then start up the computer and break into the network. Thus the testing periodicity should not exceed about half a minute. The main computer can optionally make more frequent tests of the connection, in order to collect data relevant for future connections. If the connection of the remote computer to the main computer is active, on-going work takes place uninterruptedly at the remote computer at step 348, with the periodical tests being performed at step 344. On-going work step 348 comprises reading and writing sensitive data from the encrypted operative partition, swapping memory pages to the encrypted swap partition and all other ordinary activities normally performed by the remote computer. If the connection was lost, at step 352 the remote computer unmounts the encrypted swap partition and the encrypted operative partitions, and erases the cryptokeys associated with these partitions from memory, thus disabling access to the contents of these partitions. Further at step 352, the main computer closes the connection to the remote computer. Then, a new connection is attempted at step 312 as described above. When the main computer has to authenticate the remote computer at step 312, it determines whether the connection should be authenticated according to one or more rules. Such rules can consider the down time of the connection, i.e. the length of time during which the remote computer was disconnected from the network, so that for a no-connection period of less than the predetermined period, automatic authentication is provided. However, if the no connection period is longer, authentication is preferably not approved. Another type of rules can determine that if more than a predetermined number of remote computers were disconnected, they should be automatically authenticated, since this is probably the result of a power failure. Yet another rule can relate to the specific remote computer or a user thereof. Thus, for example, a computer on which many trial installations are performed is more likely to loose connection to the main computers than others, and thus authentication can be approved automatically for that computer. It will be appreciated that additional rules can be devised and implemented for determining whether automatic authentication should be approved after a connection was broken. If the connection is not automatically authenticated, interactive communication between an operator of the main computer and a user of the remote computer is optionally required for authentication.

The disclosed method and apparatus describe a protection mechanism against a physical attack attempted at a remote computer connected to a main computer. The method and apparatus provide centrally managed partitions, which supply protection against physical stealing of a computing device or a storage device thereof, and against changing the root partition to disable a firewall and access the network. The disclosed solution uses encrypted partitions, wherein the operative partition is encrypted using a password generated by and stored on the main computer only. Thus, the contents of the operative partition will not be available to an attacker after the computer was disconnected from the network or rebooted. An encrypted swap partition is also used, wherein the cryptokey for the swap partition is preferably generated by the remote computer itself.

The above description suggests an exemplary embodiment of the disclosed method and apparatus. It will be appreciated by a person skilled in the art that the essence of the disclosed invention can be implemented using the steps of the disclosed methods in different order, or different steps, or different components stored on of the remote computer or on the main computer without departing from the spirit of the disclosed invention.

It will be appreciated by persons skilled in the art that the present invention is not limited to what has been particularly shown and described hereinabove. Rather the scope of the present invention is defined only by the claims which follow.

The invention claimed is:

1. In a computer network comprising a main computer comprising a first persistent storage device and a remote computer comprising a memory unit and a second persistent storage device, a method for protecting data stored on the second storage device of the remote computer, the method comprising the steps of:
   automatically creating a first computer generated cryptokey at the main computer;
   storing the first computer generated cryptokey on the first persistent storage device of the main computer;
   authenticating the remote computer to the main computer;
   providing the first computer generated cryptokey from the main computer to the remote computer;
   storing the first computer generated cryptokey in the memory unit of the remote computer without storing the first computer generated cryptokey in the second persistent storage device; and
   mounting an operative partition encrypted with the first computer generated cryptokey to the remote computer, said operative partition mapped to the second persistent storage device, wherein said data stored on said second persistent storage device is accessible only if while said one remote computer is in communication with said one main computer.

2. The method of claim 1 further comprising the steps of:
   automatically creating a second computer generated cryptokey at the remote computer;

storing the second computer generated cryptokey in the memory unit of the remote computer without storing the second computer generated cryptokey in the second persistent storage device the main computer;

creating a swap partition encrypted with the second computer generated cryptokey on a hard disk of the remote computer; and mounting the swap partition on the remote computer.

3. The method of claim 1 further comprising the steps of:

testing whether the remote computer is connected to the main computer; and unmounting the operative partition and erasing the first computer generated cryptokey from the memory unit of the remote computer, if the remote computer is not connected to the main computer.

4. The method of claim 1 wherein the authentication step comprises considering an at least one rule.

5. The method of claim 4 wherein the at least one rule relates to one or more or the group consisting of: when was the remote computer disconnected from the network; a user of the remote computer; or an intended use of the one remote computer.

6. The method of claim 2 wherein the swap partition is created and mounted during each boot sequence of the remote computer.

7. An apparatus for protecting data stored on a persistent storage device associated with a remote computer connected through a network to a main computer, the apparatus comprising:

a connection port to receive a first computer generated cryptokey from the main computer;

a computer generated cryptokey generator for automatically and locally generating a second computer generated cryptokey;

a memory device for storing the first and second computer generated cryptokeys, wherein the first and second computer generated cryptokeys are not stored in a persistent storage device;

a first partition generating component for generating a first encrypted partition using the first computer generated cryptokey;

a first mount/unmount device for mounting or unmounting the first encrypted partition to the remote computer using the first computer generated cryptokey, said first encrypted partition mapped to the persistent storage device;

a second partition generating component for generating encrypted swap partition using the second computer generated cryptokey;

a second mount/unmount device for mounting or unmounting the encrypted swap partition to the remote computer using the second computer generated cryptokey, said encrypted swap partition mapped to the persistent storage device;

a connection testing component for testing whether the remote computer is connected to the main computer through the network; and an authentication component for determining whether the remote computer is authenticated to be connected to the main computer.

8. A non-transitory computer readable storage medium storing a set of instructions adapted to be executed by a general purpose computer to perform a method, the method comprising:

automatically creating a first computer generated cryptokey at a main computer, wherein the main computer includes a first persistent storage device and communicates with a remote computer having a memory unit and a second persistent storage device;

storing the first computer generated cryptokey on the first persistent storage device; authenticating an at least one remote computer to the at least one main computer;

providing the first computer generated cryptokey from the main computer to the remote computer;

storing the first computer generated cryptokey in a memory unit of the remote computer without storing the first computer generated cryptokey in the second persistent storage device; and means mounting an operative partition encrypted with the first computer generated cryptokey to the remote computer, said operative partition mapped to the second persistent storage device storing data wherein said data is accessible only if said remote computer is by is in communication with said main computer.

* * * * *